US008281579B2

(12) United States Patent
Driscoll et al.

(10) Patent No.: US 8,281,579 B2
(45) Date of Patent: Oct. 9, 2012

(54) EXHAUST SYSTEM HAVING THERMOPHORETIC PARTICULATE AGGLOMERATOR

(75) Inventors: James J. Driscoll, Dunlap, IL (US); Wade J. Robel, Peoria, IL (US); Praveen S. Chavannavar, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 751 days.

(21) Appl. No.: 12/153,947

(22) Filed: May 28, 2008

(65) Prior Publication Data

US 2009/0293463 A1 Dec. 3, 2009

(51) Int. Cl.
*F01N 3/022* (2006.01)
(52) U.S. Cl. ........................................ 60/311; 60/320
(58) Field of Classification Search .................. 60/297, 60/298, 311, 320; 95/269–271; 55/434.2, 55/434.3, 385.3, 345–349, 459.1–460
See application file for complete search history.

(56) References Cited

U.S. PATENT DOCUMENTS

| 2,258,594 | A | 10/1941 | Brewer et al. |
|---|---|---|---|
| 2,673,446 | A | 3/1954 | de Salardi |
| 2,748,888 | A | 6/1956 | Hodson |
| 2,785,964 | A | 3/1957 | Pollock |
| 3,100,146 | A | 8/1963 | Huntington |
| 4,478,613 | A | 10/1984 | Brettschneider et al. |
| 4,622,051 | A | 11/1986 | Polach et al. |
| 4,689,951 | A | 9/1987 | Polach |
| 4,718,923 | A | 1/1988 | Haag et al. |
| 4,852,349 | A | 8/1989 | Abthoff et al. |
| 4,890,455 | A | 1/1990 | Leonhard et al. |
| 4,989,408 | A | 2/1991 | Leonhard et al. |
| 5,458,850 | A | 10/1995 | Krutzsch et al. |
| 5,904,042 | A * | 5/1999 | Rohrbaugh ............. 60/298 |
| 6,666,905 | B2 | 12/2003 | Page et al. |
| 2005/0178111 | A1* | 8/2005 | Kammel ............. 60/289 |
| 2006/0021503 | A1 | 2/2006 | Thaler |
| 2006/0179820 | A1* | 8/2006 | Sullivan ............. 60/275 |

OTHER PUBLICATIONS

Zhongchao Tan, "Mechanisms of Particle Separation in an Aerodynamic Air Cleaner," Transations of the ASAE, vol. 48(4): 1553-1560 (2005).
http://www.greenurban.co.uk/pertec.htm, Per-Tec Ltd—Power Trap (May 28, 2008).

* cited by examiner

*Primary Examiner* — Thomas Denion
*Assistant Examiner* — Jonathan Matthias
(74) *Attorney, Agent, or Firm* — Finnegan, Henderson, Farabow, Garrett & Dunner LLP

(57) ABSTRACT

An exhaust system for use with a combustion engine is disclosed. The exhaust system may have a passage connected to receive exhaust from the combustion engine, and a cooling device located external to the passage to create a thermal gradient across a flow area of the passage that causes particulates within the exhaust to agglomerate on a wall of the passage. The exhaust system may also have a filtration device located to separate agglomerated particulates from the exhaust.

20 Claims, 2 Drawing Sheets

US 8,281,579 B2

EXHAUST SYSTEM HAVING THERMOPHORETIC PARTICULATE AGGLOMERATOR

TECHNICAL FIELD

The present disclosure relates generally to an exhaust system and, more particularly, to an exhaust system having a thermophoretic particulate agglomerator.

BACKGROUND

Internal combustion engines, including diesel engines, gasoline engines, natural gas engines, and other engines known in the art, exhaust a complex mixture of air pollutants. Among other things, the air pollutants are composed of solid particulates. Due to increased attention on the environment, exhaust emission standards have become more stringent and the amount of particulates emitted from an engine may be regulated depending on the type of engine, size of engine, and/or class of engine. These particulates can be very small and, for that reason, have historically been collected with a fine mesh ceramic or metallic filtration medium. Although effective at removing particulates, the fine mesh filtration mediums restrict the flow of exhaust and create an unacceptable level of back pressure within the engine when saturated with particulates.

An alternative method of collecting particulates from the exhaust flow of an engine is described in U.S. Pat. No. 5,458,850 (the '850 patent) issued to Krutzsch et al. on Oct. 17, 1995. The '850 patent discloses a method of reducing particulates in exhaust gases of an internal combustion engine. The method includes passing the exhaust through an electrostatic filter. As the exhaust passes through the electrostatic filter, a high voltage is applied between a central electrode and an outer electrode, thereby generating a high voltage field through which the exhaust passes. At the same time, small particulates mass together to form larger particulates (agglomeration). The strength and extent of the high voltage field are sized such that the particulates have a greater mass and size when leaving the electrostatic filter. The exhaust gases now having the larger particulates are directed into a particulate separator, which is in the form of a cyclone. The cyclone separator divides the exhaust flow into a particulate-free exhaust gas stream and a particulate-concentrated exhaust gas stream. The particulate-free exhaust gas stream is discharged to the atmosphere, while the particulate-concentrated exhaust gas stream is fed to a cavity resonator, in which it is exposed to an electromagnet field generated by a microwave source. At the same time microwave energy is applied to the particulate-concentrated exhaust gas stream, the particulates are heated to a temperature of combustion and burned away. The exhaust gas stream from which the particulates have been extensively removed are fed from the resonator to the atmosphere. In this manner, even small particulates may be removed from an exhaust stream, without causing a significant back pressure within the internal combustion engine.

Although perhaps effective at removing small particulates from an engine's exhaust flow without adversely affecting performance of the engine, the method of the '850 patent may be inefficient and complex. In particular, the voltage levels required to agglomerate the particulates may require significant energy from the engine, which may increase operational costs of the engine. And, the components required to agglomerate the particulates are numerous, expensive, and require complicated control strategies.

The disclosed exhaust system is directed to overcoming one or more of the problems set forth above.

SUMMARY

In one aspect, the present disclosure is directed to an exhaust system for a combustion engine. The exhaust system may include a passage connected to receive exhaust from the combustion engine, and a cooling device located external to the passage to create a thermal gradient across a flow area of the passage that causes particulates within the exhaust to agglomerate on a wall of the passage. The exhaust system may also include a filtration device located to separate agglomerated particulates from the exhaust.

In another aspect, the present disclosure is directed to a method of treating exhaust. The method may include directing exhaust through a passage, and cooling a portion of the passage to agglomerate particulates on the portion of the passage. The method may also include collecting the agglomerated particulates from the exhaust after the agglomerated particulates are re-entrained within the exhaust.

DETAILED DESCRIPTION

Figure 1:
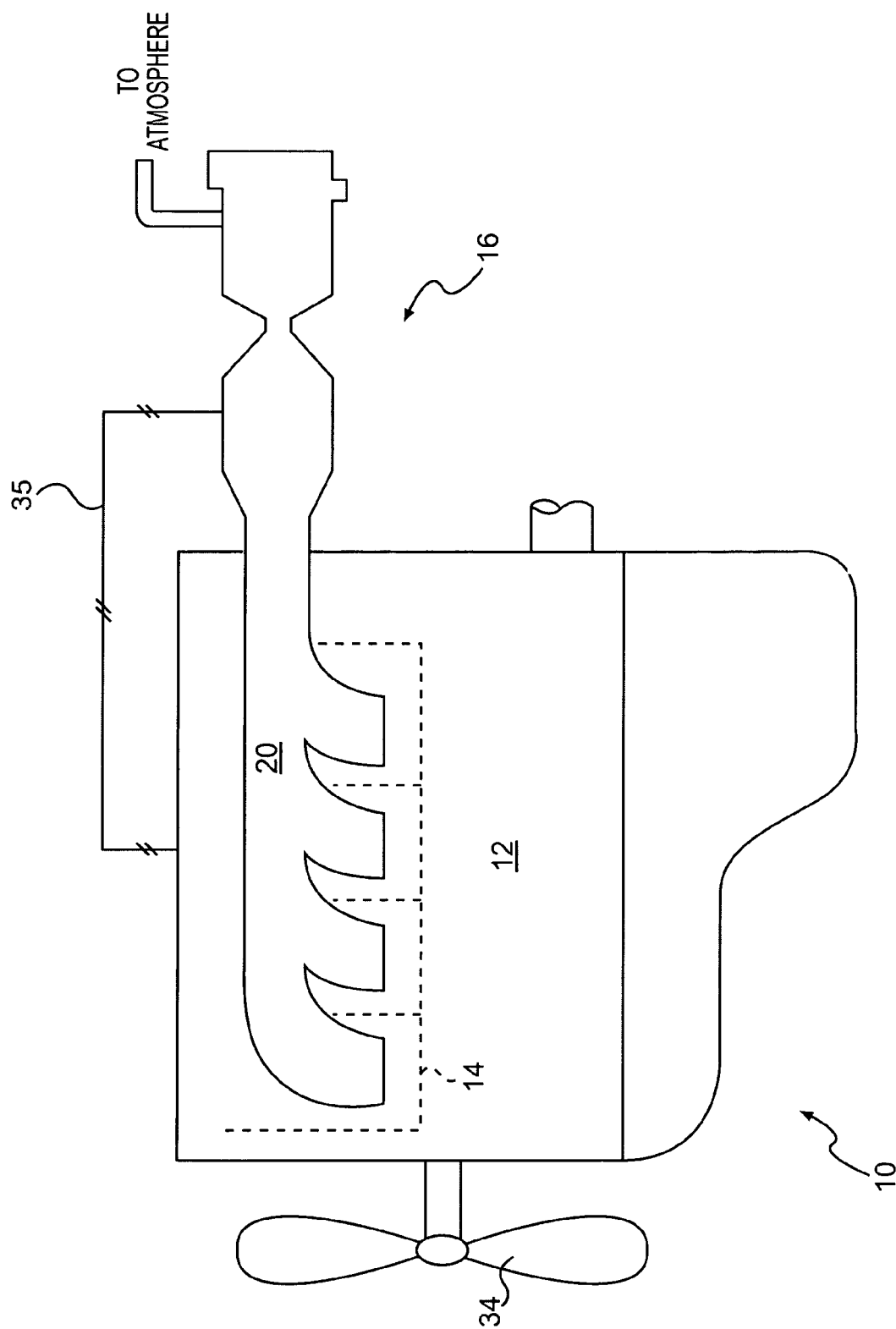
FIG. 1 is a diagrammatic illustration of an exemplary disclosed power system.

FIG. 1 illustrates an exemplary power system 10. For the purposes of this disclosure, power system 10 is depicted and described as a diesel-fueled, internal combustion engine. However, it is contemplated that power system 10 may embody any other type of combustion engine such as, for example, a gasoline or a gaseous fuel-powered engine. Power system 10 may include an engine block 12 that at least partially defines a plurality of cylinders 14. It is contemplated that power system 10 may include any number of cylinders 14 and that cylinders 14 may be disposed in an "in-line" configuration, a "V" configuration, or any other conventional configuration.

Figure 2:
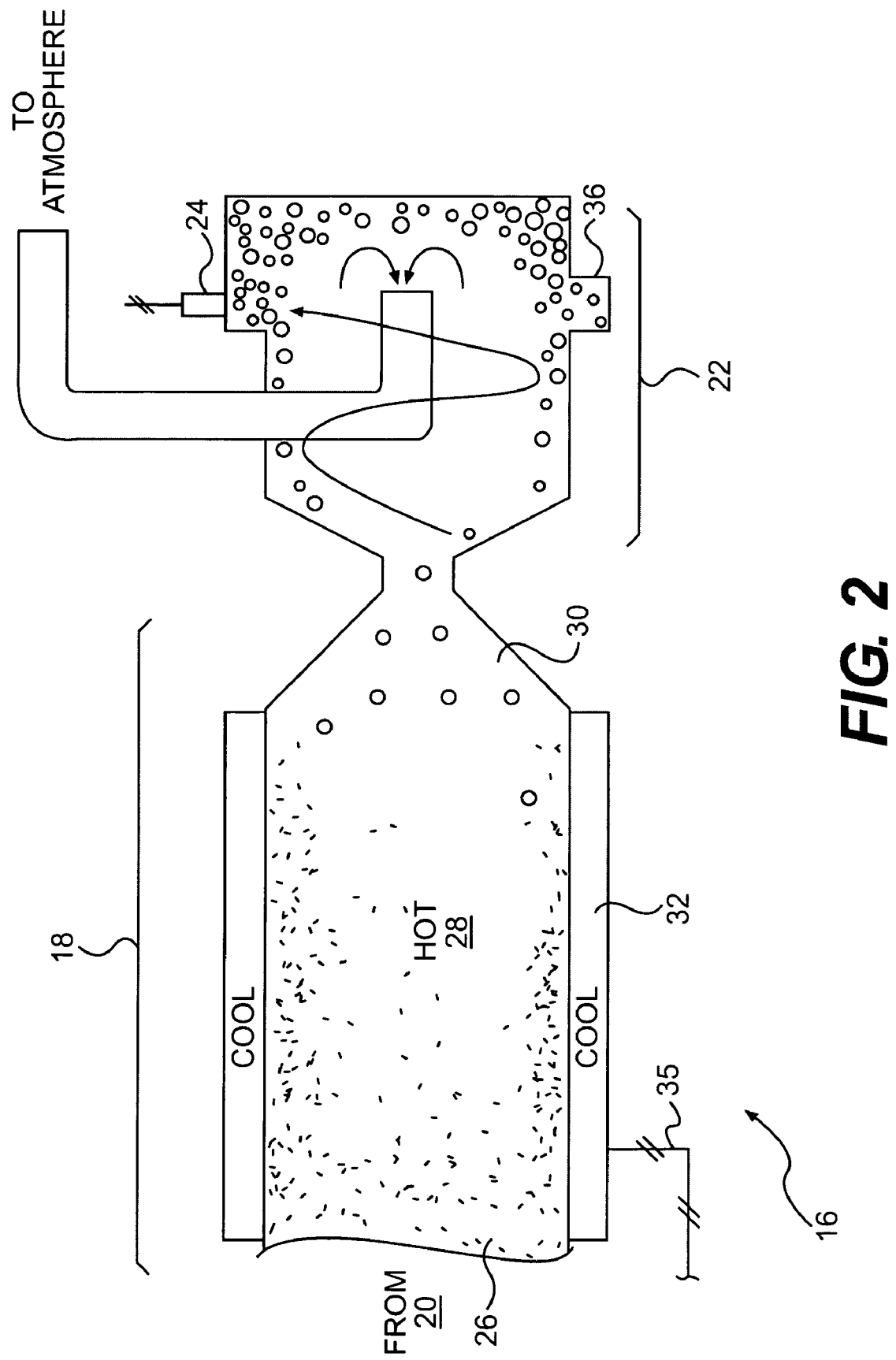
FIG. 2 is a diagrammatic illustration of an exemplary disclosed exhaust system that may be used with the power system of FIG. 1.

An exhaust system 16 may be associated with power system 10, and include components that condition and direct exhaust from cylinders 14 to the atmosphere. As illustrated in FIG. 2, exhaust system 16 may include an agglomerator 18, a filtration device 22 located downstream of agglomerator 18, and a combustion device 24 associated with filtration device 22. Agglomerator 18 may be a thermophoretic agglomerator and function to create a temperature differential within the flow of exhaust from power system 10 that causes particulate matter entrained within the exhaust to agglomerate. Filtration device 22 may function to collect the agglomerated particulate matter, while combustion device 24 may be situated to reduce the agglomerated particulate matter collected within filtration device 22.

Agglomerator 18 may have an inlet 26 connected to receive exhaust from a manifold 20 of power system 10, an outlet 30 connected to filtration device 22, and a main passage 28 disposed between inlet 26 and outlet 30. Agglomerator 18 may also include a cooling device 32 located to cool an external wall surface of main passage 28 (i.e., to absorb heat from main passage 28) thereby creating a temperature differential across a flow area of main passage 28. As heat is absorbed from main passage 28, small particulates within the hot exhaust flowing through agglomerator 18 may move from a center of the hot exhaust flow toward internal wall surfaces of agglomerator 18 by way of Brownian motion. As the small particulates impinge against an internal wall surface of main passage 28, they may stick to the internal wall surface and form a layer of particulate matter. Over time, this layer of particulate matter may become great enough that the adhesion forces keeping the layer connected to the internal wall surface are no longer sufficient to retain the particulate matter. As a result, relatively large chunks of the particulate matter layer may break away from the walls of main passage 28 and be re-entrained within the flow of exhaust passing through agglomerator 18. A temperature differential of between about 50-150° C. from a center of the exhaust flow to a periphery of the exhaust flow has been shown to effectively agglomerate particulate matter.

In one example, cooling device 32 may be a part of a cooling circuit, for example a liquid-to-air heat exchanger. In this example, a liquid, for example water, glycol, a water/glycol mixture, a blended air mixture, a high pressure coolant, or another liquid may be directed to transfer heat with the passage walls of agglomerator 18 (i.e., to absorb heat from an external wall surface of main passage 28). In turn, the walls of main passage 28 may absorb heat from the exhaust flowing through agglomerator 18 such that the temperature differential within the flow of exhaust is created. It is contemplated that, in this configuration, the cooling liquid may be received from and discharged to a general cooling circuit of power system 10 or, alternatively, received from and discharged to a dedicated cooling circuit, if desired.

In another example, cooling device 32 may embody a portion of an air-to-air heat exchanging system. This portion may include, among other things, fins, vanes, or passages configured to direct cooling air from a fan 34 (referring to FIG. 1), a compressor (not shown), or other component driven by power system 10 to absorb heat from main passage 28.

It is contemplated that the heat absorbed from main passage 28 may be used more efficiently, if desired. That is, in yet another example, cooling device 32 may embody a thermoelectric device situated in heat exchange relationship with the walls of main passage 28 to absorb heat therefrom and convert the absorbed heat into electricity for other uses within power system 10. Any conventional thermoelectric device known in the art may be utilized for this purpose. It is also contemplated that cooling device 32 may utilize a thermo-electric device in conjunction with a liquid or air cooling system (i.e., one surface of the thermo-electric devices may be situated to absorb heat from passage 28, while an opposing surface may be situated to transfer heat with a liquid coolant or with air to increase an electrical output of the thermo-electric devices), if desired. In these configurations, cooling device 32 may be electrically connected to supplement operation of power system 10 (e.g., to charge a battery or to power an accessory load of power system 10) by way of a communication line 35.

After the particulate matter has agglomerated onto the internal wall surfaces of main passage 28 to form a layer of particulate matter buildup, particulate matter chunks may be torn away by the exhaust flow and be passed into filtration device 22. Although shown as passing through a necked-down region between outlet 30 and an inlet of filtration device 22, it is contemplated that main passage 28, outlet 30, and the inlet of filtration device 22 may have about the same cross-sectional area, if desired.

In one example, filtration device 22 may be a centrifugal filter. As a centrifugal filter, filtration device 22 may include geometry (e.g., vanes, fins, passages, etc.) that promotes a swirling or spinning of the exhaust flow. As the exhaust spins within filtration device 22, the relatively heavy chunks of particulate matter may be forced outward by the associated centrifugal force to impinge against the inner walls filtration device 22, while the relatively particulate-free exhaust may pass through filtration device 22 and be redirected to the atmosphere substantially uninhibited. As the chunks of particulate matter are forced radially outward and against the walls of filtration device 22, their inertia may inhibit them from being redirected and exiting filtration device 22 with the exhaust and instead trap them within a collection container 36. In one example, collection container 36 may be an annular recess located within a internal wall of filtration device 22. In another example, collection container 36 may be a passageway or other enclosure (i.e., a separate component) in fluid communication with filtration device 22.

In order to facilitate continued operation of power system 10, the particulate matter trapped within collection container 36 may need to be periodically or continuously reduced. In one example, collection container 36 may be manually removable by a service technician and emptied as part of a general maintenance routine. In another example, combustion device 24 may be utilized to oxidize the particulate matter built up within collection container 36.

Combustion device 24 may include a fuel-fired or electrically-powered burner, a microwave device, a catalyst, and/or any other appropriate type of device configured to direct energy into collection container 36 and thereby raise the temperature of the trapped particulate matter to a combustion threshold or to lower a combustion threshold of the trapped particulate matter. Combustion device 24 may be controlled to initiate combustion of the trapped particulate matter in response to one or more input such as, for example, an elapsed period of power system operation, a measurement of particulate matter buildup, or any other suitable condition. Alternatively, combustion device 24 may operate to continuously oxidize the built up particulate matter.

INDUSTRIAL APPLICABILITY

The disclosed exhaust system may be applicable to any combustion-type device such as, for example, an engine, a furnace, or any other device known in the art where efficient removal of particulate matter from an exhaust flow is desired. Exhaust system 16 may provide a unique solution for reducing the amount of large and small particulate matter exhausted to the environment without adversely affecting back pressure of the associated combustion device.

Several advantages may be associated with the disclosed exhaust system. Specifically, because the disclosed exhaust system may require little, if any, additional power be supplied to agglomerator 18, the operating cost of power system 10 may be substantially unaffected by operation of exhaust system 16. And, because exhaust system 16 may require relatively few components, the system may be simple and inexpensive.

It will be apparent to those skilled in the art that various modifications and variations can be made to the disclosed exhaust system. Other embodiments will be apparent to those skilled in the art from consideration of the specification and practice of the disclosed exhaust system. It is intended that the specification and examples be considered as exemplary only, with a true scope being indicated by the following claims and their equivalents.

What is claimed is:

1. An exhaust system for a combustion engine, comprising:
   a passage connected to receive exhaust from the combustion engine;

a cooling device located external to the passage to create a thermal gradient across a flow area of the passage which causes particulates within the exhaust to agglomerate on a wall of the passage which is surrounded by the cooling device; and a filtration device located downstream of the cooling device and downstream of a necked-down portion of the passage, to separate agglomerated particulates from the exhaust by swirling the exhaust such that the agglomerated particulates are forced radially outward and against a wall of the filtration device, the filtration device having a diameter greater than a diameter of the necked down portion.

2. The exhaust system of claim 1, wherein the filtration device is a centrifugal filter.

3. The exhaust system of claim 1, wherein the cooling device is a thermoelectric device configured to absorb heat from the wall of the passage and convert absorbed heat to electricity.

4. The exhaust system of claim 3, wherein the electricity is directed back to supplement operation of the combustion engine.

5. The exhaust system of claim 1, wherein the cooling device is a heat exchanger.

6. The exhaust system of claim 5, wherein the heat exchanger is a liquid-to-air heat exchanger.

7. The exhaust system of claim 1, wherein the cooling device is configured to direct a flow of air from an engine-driven fan to absorb heat from the passage.

8. The exhaust system of claim 1, further including a combustion device configured to combust the separated and agglomerated particulate matter.

9. The exhaust system of claim 8, further including a collection container associated with the filtration device to trap the separated and agglomerated particulate matter, wherein the combustion device is located to direct energy into the collection container.

10. The exhaust system of claim 1, wherein the filtration device includes a removable collection container.

11. A power system, comprising:
a combustion engine;
a passage connected to receive exhaust from the combustion engine;
a cooling device located external to and directly on the passage to create a thermal gradient across a flow area of the passage which causes particulates within the exhaust to agglomerate on a wall of the passage which is surrounded by the cooling device;
a centrifugal filter located downstream of the cooling device and downstream of a necked-down portion of the passage, to separate agglomerated particulates from the exhaust by swirling the exhaust such that the agglomerated particulates are forced radially outward and against a wall of the centrifugal filter;
a collection container configured to collect the agglomerated particulates separated by the centrifugal filter, the collection container including a recess formed in the wall of the centrifugal filter; and
a combustion device associated with the collection container to reduce the collected and agglomerated particulates.

12. The power system of claim 11, wherein the cooling device is a thermoelectric device configured to absorb heat from the wall of the passage and convert the absorbed heat to electricity that is directed back to supplement operation of the combustion engine.

13. The power system of claim 11, wherein the cooling device is a heat exchanger configured to direct coolant from within the combustion engine to absorb heat from the wall of the passage.

14. A method of treating exhaust from a combustion engine, comprising:
directing exhaust through a passage;
cooling a portion of the passage with a cooling device that surrounds the portion of the passage, the cooling being sufficient to agglomerate particulates on the portion of the passage;
collecting the agglomerated particulates in a layer on the cooled portion of the passage;
breaking off a portion of the layer of agglomerated particulates so that the agglomerated particulates are re-entrained within the exhaust; and
separating the agglomerated particulates from the exhaust after the agglomerated particulates are re-entrained within the exhaust by swirling the exhaust such that the agglomerated particulates are forced radially outward and against a wall of a filtration device, to thereby collect the agglomerated particulates in an annular recess located within the wall of the filtration device.

15. The method of claim 14, further including collecting the agglomerated particulates by spinning the agglomerated particulates radially outward.

16. The method of claim 14, wherein cooling the portion of the passage includes absorbing heat from the portion of the passage and converting the absorbed heat to electricity.

17. The method of claim 16, further including directing the electricity to supplement engine operation.

18. The method of claim 14, wherein cooling the portion of the passage includes directing a liquid coolant to absorb heat from the portion of the passage.

19. The method of claim 14, wherein cooling the portion of the passage includes directing air to absorb heat from the portion of the passage.

20. The method of claim 14, further including combusting the collected and agglomerated particulates.

* * * * *